(12) United States Patent
Austrheim

(10) Patent No.: US 11,505,198 B2
(45) Date of Patent: Nov. 22, 2022

(54) VEHICLE TILTING DEVICE, AN ACCESS STATION, A DELIVERY SYSTEM AND A METHOD OF ACCESSING A STORAGE CONTAINER

(71) Applicant: Autostore Technology AS, Nedre Vats (NO)

(72) Inventor: Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 11 days.

(21) Appl. No.: 17/059,269

(22) PCT Filed: Jun. 11, 2019

(86) PCT No.: PCT/EP2019/065217
§ 371 (c)(1),
(2) Date: Nov. 27, 2020

(87) PCT Pub. No.: WO2019/238681
PCT Pub. Date: Dec. 19, 2019

(65) Prior Publication Data
US 2021/0229912 A1    Jul. 29, 2021

(30) Foreign Application Priority Data

Jun. 12, 2018  (NO) .................................. 20180813
Jul. 19, 2018   (NO) .................................. 20181005
Dec. 20, 2018  (NO) .................................. 20181656

(51) Int. Cl.
*B65G 65/23*    (2006.01)
*B65G 47/06*    (2006.01)
(Continued)

(52) U.S. Cl.
CPC .......... *B60W 50/0098* (2013.01); *B61B 13/00* (2013.01); *B65G 1/0414* (2013.01);
(Continued)

(58) Field of Classification Search
CPC ........ B61B 13/00; B65G 47/06; B65G 47/52; B65G 65/23; B66F 9/19
(Continued)

(56) References Cited

U.S. PATENT DOCUMENTS 2,681,738 A *  6/1954  Granath ................ B22D 29/00
                                                414/370
3,519,150 A     7/1970  Keena et al.
(Continued)

FOREIGN PATENT DOCUMENTS

CA       2988122 A1    12/2016
CN      101553416 A    10/2009
(Continued)

OTHER PUBLICATIONS

Office Action issued in Chinese Application No. 201980037162.3; dated Sep. 27, 2021 (8 pages).
(Continued)

*Primary Examiner* — Douglas A Hess
(74) *Attorney, Agent, or Firm* — Osha Bergman Watanabe & Burton LLP

(57) ABSTRACT

A vehicle tilting device for tilting a delivery vehicle for increasing access to items from a storage container transported on the delivery vehicle. The vehicle tilting device comprises a base structure and a tiltable platform connected to the base structure, wherein the tiltable platform comprises guiding features adapted to guide the delivery vehicle onto the tiltable platform. The tiltable platform is arranged to be connected to a delivery grid cell of a delivery rail system such that that there is a path to and/or from the tiltable platform for the delivery vehicle via the delivery grid cell. The invention is also related to an access station, a delivery system and a method of accessing a storage container.

11 Claims, 9 Drawing Sheets

(51) Int. Cl.

| | | |
|---|---|---|
| *B65G 47/52* | (2006.01) | |
| *B66F 9/19* | (2006.01) | |
| *B61B 13/00* | (2006.01) | |
| *B60W 50/00* | (2006.01) | |
| *G05D 1/00* | (2006.01) | |
| *B65G 1/04* | (2006.01) | |
| *B65G 1/06* | (2006.01) | |
| *B65G 1/137* | (2006.01) | |
| *B65G 57/03* | (2006.01) | |
| *B65G 63/06* | (2006.01) | |
| *B66F 9/06* | (2006.01) | |
| *G05D 1/02* | (2020.01) | |
| *B65G 67/24* | (2006.01) | |
| *B65G 43/00* | (2006.01) | |
| *B65G 63/00* | (2006.01) | |

(52) U.S. Cl.
CPC .......... *B65G 1/0457* (2013.01); *B65G 1/0464* (2013.01); *B65G 1/0471* (2013.01); *B65G 1/0478* (2013.01); *B65G 1/0485* (2013.01); *B65G 1/0492* (2013.01); *B65G 1/065* (2013.01); *B65G 1/1375* (2013.01); *B65G 43/00* (2013.01); *B65G 47/06* (2013.01); *B65G 47/52* (2013.01); *B65G 57/03* (2013.01); *B65G 63/06* (2013.01); *B65G 65/23* (2013.01); *B65G 67/24* (2013.01); *B66F 9/063* (2013.01); *B66F 9/19* (2013.01); *G05D 1/0011* (2013.01); *G05D 1/021* (2013.01); *G05D 1/0291* (2013.01); *B60W 2710/06* (2013.01); *B60W 2720/10* (2013.01); *B60W 2720/24* (2013.01); *B65G 1/1378* (2013.01); *B65G 63/004* (2013.01); *B65G 2201/0235* (2013.01); *B65G 2201/0258* (2013.01); *B65G 2203/0283* (2013.01); *B65G 2203/042* (2013.01); *G05D 1/02* (2013.01); *G05D 1/0229* (2013.01); *G05D 1/0231* (2013.01); *G05D 1/0259* (2013.01); *G05D 1/0289* (2013.01); *G05D 2201/0216* (2013.01)

(58) Field of Classification Search
USPC .............................. 198/465.1; 414/419, 420
See application file for complete search history.

(56) References Cited

U.S. PATENT DOCUMENTS

| | | | |
|---|---|---|---|
| 3,800,963 A | | 4/1974 | Holland |
| 3,821,978 A | * | 7/1974 | Kauffman ............... B65G 35/08 164/404 |
| 4,538,950 A | | 9/1985 | Shiomi et al. |
| 4,789,289 A | * | 12/1988 | Wilson .................. A01D 87/127 241/101.76 |
| 4,909,697 A | | 3/1990 | Bernard, II et al. |
| 5,078,566 A | | 1/1992 | Ferrence |
| 5,310,302 A | * | 5/1994 | Ferguson, Sr. ............ B66F 9/19 414/420 |
| 5,360,306 A | | 11/1994 | Nakayama et al. |
| 5,538,809 A | | 7/1996 | Bittihn et al. |
| 6,379,097 B1 | * | 4/2002 | Vondenhuevel ....... B65G 65/23 414/421 |
| 6,547,509 B1 | * | 4/2003 | Edmo ...................... B66F 7/22 254/10 R |
| 7,101,139 B1 | | 9/2006 | Benedict |
| 8,628,289 B1 | | 1/2014 | Benedict et al. |
| 9,248,772 B2 | * | 2/2016 | Oren ................... B65D 88/022 |
| 9,527,669 B1 | | 12/2016 | Hanssen et al. |
| 10,336,542 B2 | * | 7/2019 | Garrett ................. B65G 47/52 |
| 2003/0093176 A1 | | 5/2003 | Ohtsuka et al. |
| 2005/0047895 A1 | | 3/2005 | Lert |
| 2008/0014062 A1 | | 1/2008 | Yuyama et al. |
| 2011/0027059 A1 | | 2/2011 | Benedict et al. |
| 2012/0282068 A1 | | 11/2012 | Tschurwald et al. |
| 2014/0014470 A1 | | 1/2014 | Razumov |
| 2014/0086714 A1 | | 3/2014 | Malik |
| 2014/0277693 A1 | | 9/2014 | Naylor |
| 2014/0288696 A1 | | 9/2014 | Lert |
| 2014/0292274 A1 | | 10/2014 | Dorval et al. |
| 2014/0311858 A1 | | 10/2014 | Keating et al. |
| 2016/0060037 A1 | | 3/2016 | Razumov |
| 2016/0137435 A1 | | 5/2016 | Tanaka et al. |
| 2016/0176638 A1 | | 6/2016 | Toebes |
| 2016/0325932 A1 | | 11/2016 | Hognaland |
| 2017/0057745 A1 | | 3/2017 | Ueda et al. |
| 2017/0166400 A1 | | 6/2017 | Hofmann |
| 2018/0044110 A1 | | 2/2018 | Clarke et al. |
| 2018/0068253 A1 | | 3/2018 | Simms et al. |
| 2018/0082162 A1 | | 3/2018 | Durham et al. |
| 2018/0118078 A1 | | 5/2018 | Alkhaldi et al. |
| 2018/0141754 A1 | | 5/2018 | Garrett et al. |
| 2018/0150793 A1 | | 5/2018 | Lert, Jr. et al. |
| 2018/0305123 A1 | | 10/2018 | Lert, Jr. |
| 2020/0148474 A1 | | 5/2020 | Salichs et al. |

FOREIGN PATENT DOCUMENTS

| | | |
|---|---|---|
| CN | 101711210 A | 5/2010 |
| CN | 102050333 A | 5/2011 |
| CN | 102992012 A | 3/2013 |
| CN | 104066661 A | 9/2014 |
| CN | 104781163 A | 7/2015 |
| CN | 104885106 A | 9/2015 |
| CN | 105383848 A | 3/2016 |
| CN | 105517923 A | 4/2016 |
| CN | 105899398 A | 8/2016 |
| CN | 105947514 A | 9/2016 |
| CN | 106064718 A | 11/2016 |
| CN | 106241154 A | 12/2016 |
| CN | 106414278 A | 2/2017 |
| CN | 106575391 A | 4/2017 |
| CN | 106660703 A | 5/2017 |
| CN | 106662874 A | 5/2017 |
| CN | 106829298 A | 6/2017 |
| CN | 106829298 A | 6/2017 |
| CN | 206790852 U | 12/2017 |
| CN | 108140168 A | 6/2018 |
| DE | 40 16 810 C1 | 11/1991 |
| DE | 4016810 C1 | 11/1991 |
| DE | 9310690 U1 | 9/1993 |
| DE | 102009017241 A | 10/2010 |
| DE | 102012025163 A1 | 6/2014 |
| DE | 102012025163 Y | 6/2014 |
| EP | 0458021 A | 11/1991 |
| EP | 0458021 A1 | 11/1991 |
| EP | 0458021 A1 | 11/1991 |
| EP | 0534558 A1 | 3/1993 |
| EP | 2881905 A1 | 6/2015 |
| EP | 2918519 A | 9/2015 |
| EP | 2918519 A1 | 9/2015 |
| EP | 2918519 Y | 9/2015 |
| EP | 3003932 A1 | 4/2016 |
| GB | 1 267 751 A | 3/1972 |
| GB | 1276160 A | 6/1972 |
| GB | 2106070 A | 4/1983 |
| GB | 2211822 A | 7/1989 |
| GB | 2 233 319 A | 1/1991 |
| JP | S64-017707 A | 1/1989 |
| JP | S6485656 A | 3/1989 |
| JP | H09-152914 A | 6/1997 |
| JP | 2017088404 A | 5/2017 |
| KR | 101384551 B1 | 4/2014 |
| KR | 101384551 Y | 4/2014 |
| KR | 20170026074 A | 3/2017 |
| NO | 317366 B | 10/2004 |
| RU | 2008111257 A | 10/2009 |
| WO | 96/14258 A1 | 5/1996 |
| WO | 2005/077789 A1 | 8/2005 |
| WO | 2012/106747 A1 | 8/2012 |
| WO | 2014/075937 A1 | 5/2014 |

(56) References Cited

FOREIGN PATENT DOCUMENTS

| | | |
|---|---|---|
| WO | WO2014/075937 A1 | 5/2014 |
| WO | WO2014/090684 | 6/2014 |
| WO | 2014/195901 A1 | 12/2014 |
| WO | 2014195901 A1 | 12/2014 |
| WO | WO2014/195901 A | 12/2014 |
| WO | 2015/084236 A1 | 6/2015 |
| WO | 2015/140216 A1 | 9/2015 |
| WO | 2015193278 A1 | 12/2015 |
| WO | WO 2015/193278 A | 12/2015 |
| WO | WO 2015/193278 A1 | 12/2015 |
| WO | 2016/166323 A1 | 10/2016 |
| WO | WO2016/166294 A | 10/2016 |
| WO | 2016/196815 A1 | 12/2016 |
| WO | 2016/198467 A1 | 12/2016 |
| WO | 2016/198565 A1 | 12/2016 |
| WO | 2016196815 A1 | 12/2016 |
| WO | WO2016/196815 A | 12/2016 |
| WO | WO2016/196815 A1 | 12/2016 |
| WO | 2017/081281 A1 | 5/2017 |
| WO | 2017-081281 A1 | 5/2017 |
| WO | 2017081273 A1 | 5/2017 |
| WO | WO2017/081281 A | 5/2017 |
| WO | WO2017/081281 A1 | 5/2017 |
| WO | 2017/121515 A1 | 7/2017 |
| WO | 2017/153563 A1 | 9/2017 |
| WO | WO2017/197121 A | 11/2017 |
| WO | WO2017/197121 A1 | 11/2017 |
| WO | WO2017/211640 A | 12/2017 |
| WO | WO2017/220651 A | 12/2017 |
| WO | WO2017/220651 A1 | 12/2017 |
| WO | 2018/162757 A1 | 9/2018 |
| WO | WO2018/195200 A1 | 10/2018 |
| WO | WO2018/195200 P | 10/2018 |

OTHER PUBLICATIONS

Extended European Search Report issued in European Application No. 21186410.3, dated Nov. 25, 2021 (5 pages).
Office Action in counterpart Chinese Patent Application No. 201980038106.1 dated Sep. 8, 2021 (6 pages).
Office Action in counterpart Chinese Patent Application No. 201980039028.7 dated Oct. 27, 2021 (15 pages).
Office Action in counterpart Chinese Patent Application No. 201980039046.5 dated Sep. 15, 2021 (18 pages).
Office Action in counterpart Chinese Patent Application No. 201980039068.1 dated Sep. 15, 2021 (23 pages).
NOSR of Jun. 4, 2019.
NOSR of Feb. 6, 2019.
ISR of Sep. 26, 2019.
ISR of Sep. 12, 2019.
ISR (2) of Sep. 12, 2019.
IPRP of Jul. 21, 2020.
Office Action issued in Chinese Application No. 201980039066.2 dated Sep. 10, 2021 (6 pages).
Search Report issued in Chinese Application No. 201980039066.2 dated Sep. 6, 2021 (2 pages).
Office Action issued in the counterpart Chinese Patent Application No. 201980037723X, dated Sep. 17, 2021 (25 pages).
Office Action issued in the counterpart Chinese Patent Application No. 2019800383353, dated Dec. 17, 2021 (3 pages).
Office Action in counterpart Chinese Patent Application No. 201980038856.9 dated Oct. 19, 2021 (16 pages).
Office Action in counterpart Chinese Patent Application No. 2019800538763 dated Dec. 6, 2021 (13 pages).
Office Action in counterpart Chinese Patent Application No. 2019800393798 dated Dec. 9, 2021 (17 pages).
United States Office Action in related U.S. Appl. No. 16/972,482, dated Mar. 22, 2022 (46 pages).

\* cited by examiner

A

B

VEHICLE TILTING DEVICE, AN ACCESS STATION, A DELIVERY SYSTEM AND A METHOD OF ACCESSING A STORAGE CONTAINER

The invention is related to a vehicle tilting device for tilting a delivery vehicle for increasing access to items from a storage container transported on the delivery vehicle.

BACKGROUND AND PRIOR ART

FIGS. 1A and 1C disclose a typical prior art automated storage and retrieval system 1 with a framework structure 100. FIGS. 1B and 1D disclose a prior art container handling vehicle 101 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 200,300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIGS. 1A and 1C, Z=8 identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 101 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column 105, e.g. as is disclosed in WO2014/090684A1.

The rail system 108 may be a single rail system, as is shown in FIG. 2A. Alternatively, the rail system 108 may be a double rail system, as is shown in FIG. 2B, thus allowing a container handling vehicle 201 having a footprint generally corresponding to the lateral area defined by a grid column 112 to travel along a row of grid columns even if another container handling vehicle 200 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box.

Consequently, rails 110a and 110b form pairs of rails defining parallel rows of grid cells running in the X direction, and rails 111a and 111b form pairs of rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300 can drop off storage containers 106 to be transported through the delivery column 119 and further to an access or a transfer station, and the second delivery column 120 may comprise a dedicated pick-up port where the container handling vehicles 200,300 can pick up storage containers 106 that have been transported through the delivery column 120 from an access or a transfer station. Each of the ports of the first and second delivery column may comprise a port suitable for both pick up and drop of storage containers.

The second location may typically be a picking or a stocking station where product items are removed from or positioned into the storage containers 106. In a picking or a stocking station, the storage containers 106 are normally never removed from the automated storage and retrieval system 1 but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

At the picking or stocking station, the storage containers arrive at a high speed in order to expedite the handling operation. If the items held in storage containers are not easily accessible, the area surrounding the picking or stocking station may become congested with storage containers. This may seriously delay or impede the operation of the automated storage and retrieval system.

In view of the above, it is desirable to provide a device for increasing access to items stored in a storage container which has been delivered to the picking or stocking station.

It is an objective of the present invention to provide a high efficiency automated storage and retrieval system which are effective, easy to install, and which delivery capacity can easily be increased after completed installation.

Yet another objective is to provide a dedicated area where storage containers and items held in the storage containers, effectively and easily can be handled.

SUMMARY OF THE INVENTION

The invention is set forth in the independent claims and the dependent claims describe alternatives of the invention.

In the following the term "remotely operated delivery vehicle" is referred to as the "delivery vehicle" and the term "automated storage and retrieval grid" is referred to as the "storage grid". The term "a storage container" is also known in prior art as "a bin". The term "picking and stocking station" is also referred to as an "access station" or "accessing station".

The invention is related to a vehicle tilting device for tilting a delivery vehicle for increasing access to items from a storage container transported on the delivery vehicle. The vehicle tilting device comprises a base structure and a tiltable platform connected to the base structure, wherein the tiltable platform comprises guiding features adapted to guide the delivery vehicle onto the tiltable platform. The tiltable platform is arranged to be connected to a delivery grid cell of a delivery rail system such that that there is a path to and/or from the tiltable platform for the delivery vehicle via the delivery grid cell.

The guiding features may comprise raised edges provided along a periphery of the tiltable platform such that the delivery vehicle is guided onto the tiltable platform. Thus, the rolling devices or the wheels of the delivery vehicle may be guided such that they are located on the platform at the inside of the raised edges.

The raised edges may comprise a first set of parallel edges extending in a first direction, and a second set of parallel edges extending in a second direction (Y) which is orthogonal to the first direction (X), which first and second sets of edges together defining a platform grid cell.

The raised edges providing a "wall" along the sides of the tiltable platform such that the rolling devices or wheels of the delivery vehicle is prevented from rolling off the tiltable platform in any one of the X or Y direction. The raised edges may not be connected at their ends such that there are openings allowing the rolling devices or wheels of the delivery vehicle to enter or exit the tiltable platform in both X and Y direction.

The vehicle tilting device may comprise a unit (or set of units) that is fitted at an end of the delivery rail system to make up an additional grid cell or an additional row of grid cells that is/are able to tilt up a delivery vehicle carrying a container. The vehicle tilting device may connect with the delivery rail system in the sense of providing a continuation of the delivery rail system that the delivery vehicles can drive onto. The vehicle tilting device may not be directly connected to the rest of the delivery rail system; alternatively, it may be connected mechanically with the delivery rail system, for example, through being connected with fasteners or through other mechanical engagement.

An access point may be defined as a location at the delivery rail system at which a robot or human operator may access items held in the storage containers delivered to the access point by the delivery vehicle. Preferably, the vehicle tilting device is located at the access point of the delivery rail system for increased access to items held in a storage container transported on the delivery vehicle.

One of the edges of the first and/or second sets of parallel edges may provide a stop edge of the tiltable platform to prevent the delivery vehicle from running off the platform or falling off the tiltable platform when the platform is tilted.

One of the edges of the first and/or second sets of parallel edges may be provided with a taller edge (higher raised edges) such that the delivery vehicle is prevented from passing the higher raised edge and falling off the tiltable platform.

The taller edge may be located at a second platform side, such that the delivery vehicle is tilted towards the taller edge.

In embodiment, the taller edge may be a support/stop wall for supporting the delivery vehicle on the tiltable platform such that the delivery vehicle is prevented from rolling off the platform when being tilted. Furthermore, the support wall may act as a stopper for the delivery vehicle while driving onto the tiltable platform and prevent the delivery vehicle from rolling off the platform at opposite end.

The taller edge (support wall) may also be arranged at one side in the Y direction, such that the delivery vehicle is prevented from rolling off the platform to one of the sides in the Y direction.

In a container accessing station comprising one or more tiltable platform devices, the tiltable platform may comprise a taller edge or lip along the side closest to the pivot which supports the body of the delivery vehicle when the tiltable platform is tilted up to protect the human or robotic operator.

The tiltable platform may be pivotably connected to the base structure at a first platform side and arranged such that the tiltable platform it tilted towards a robotic or human operator.

The tiltable platform may comprise a tilting actuator arranged for lifting the tiltable platform at a second platform side which is opposite the first platform side, such that the tiltable platform is tilted towards the first platform side.

The tilting device may comprise a motor for operating a lifting mechanism. The lifting mechanism may be a telescoping rod or a jack. The motor may be an electric motor for operating a pneumatic, hydraulic or mechanical extendable rod and/or jack. The tilting device may also comprise a motor for driving a lifting arm.

In an embodiment, the base structure may comprise adjustable feet for height adjustment of the tiltable platform such that the tiltable platform has same height as the delivery rail system, thus, allowing a delivery vehicle to enter/exit the tiltable platform from/to the delivery rail system.

The invention is also directed to a container accessing station comprising a tilting device. The container accessing station may be defined as any means for protecting the human operator from components of the delivery system (rails and delivery vehicles) and for allowing easy handling of the storage container and its contents. In other words, it provides a barrier between the human operator components of the delivery system. An access point may be located in the container accessing station. The vehicle tiling device may be located at the access point of the container accessing station.

The vehicle tiling device comprises a base structure and a tiltable platform connected to the base structure, wherein the tiltable platform comprises a first set of parallel edges extending in a first direction (X), and a second set of parallel edges extending in a second direction (Y) which is orthogonal to the first direction (X), which first and second sets of raised edges together defining a platform grid cell, wherein the platform grid cell is adapted to be connected to a delivery grid cell of a delivery rail system such that that there is a path to and/or from the tiltable platform for the delivery vehicle via the delivery grid cell.

The container accessing station may comprise a first and a second vehicle tilting device, and wherein the first and the second tilting device are connected to each other such that a delivery vehicle can move between the platform grid cell of the first and the second vehicle tilting device, and wherein each of the first and the second tilting device is connected to a respective grid cell of a delivery rail system such that there is more than one path to and from each tilting device for the delivery vehicle.

The container accessing station may further comprises at least any one of a cabinet or a wall arranged for separating the human operator from the vehicle tilting device.

The container accessing station may be provided with an activation device such as a switch, push button or a lever, for operating the vehicle tilting device. In order to maintain a continuous flow of deliver vehicles carrying storage containers entering and exiting the access point, the vehicle tiling device may be operated only if necessary. The tilting operation of the vehicle tilting device will consume some time and will therefore only be operated in special cases. In operation, the at least one of a robotic or human operator may activate the tilting function by pressing a button or turning a switch or a lever. After the storage container has been accessed, the at least one of a robotic or human operator may push the activation device such that the vehicle tilting device is returned to its non-tilted position.

The invention is also directed to a delivery system comprising a delivery rail and wherein the delivery rail comprises a first set of parallel rails arranged in a horizontal plane (P1) and extending in a first direction (X), and a second set of parallel rails arranged in the horizontal plane (P1) and extending in a second direction (Y) which is orthogonal to the first direction (X). The delivery system further comprises a container accessing station comprising a vehicle tilting device located at an access point of the delivery system, and wherein the vehicle tiling device is connected to the delivery rail such that a delivery vehicle can move from the delivery rail and onto the vehicle tilting device.

The invention is also related to a method of accessing a container carried on a delivery vehicle, comprising guiding the delivery vehicle onto a tiltable platform of a vehicle tilting device and tilting the delivery vehicle together with the container being carried towards a human or robotic operator in order to allow increased access to items inside the container.

BRIEF DESCRIPTION OF THE DRAWINGS

FIG. 1C shows the complete system and FIG. 1B and FIG. 1D show examples of system-operable prior art container handling vehicles.

FIG. 2A shows a single-track system, FIG. 2B shows a double track system 2B and FIG. 2C shows a double track system indicating width and length of a container handling vehicle grid cell.

DETAILED DESCRIPTION OF THE INVENTION

Figure 1:
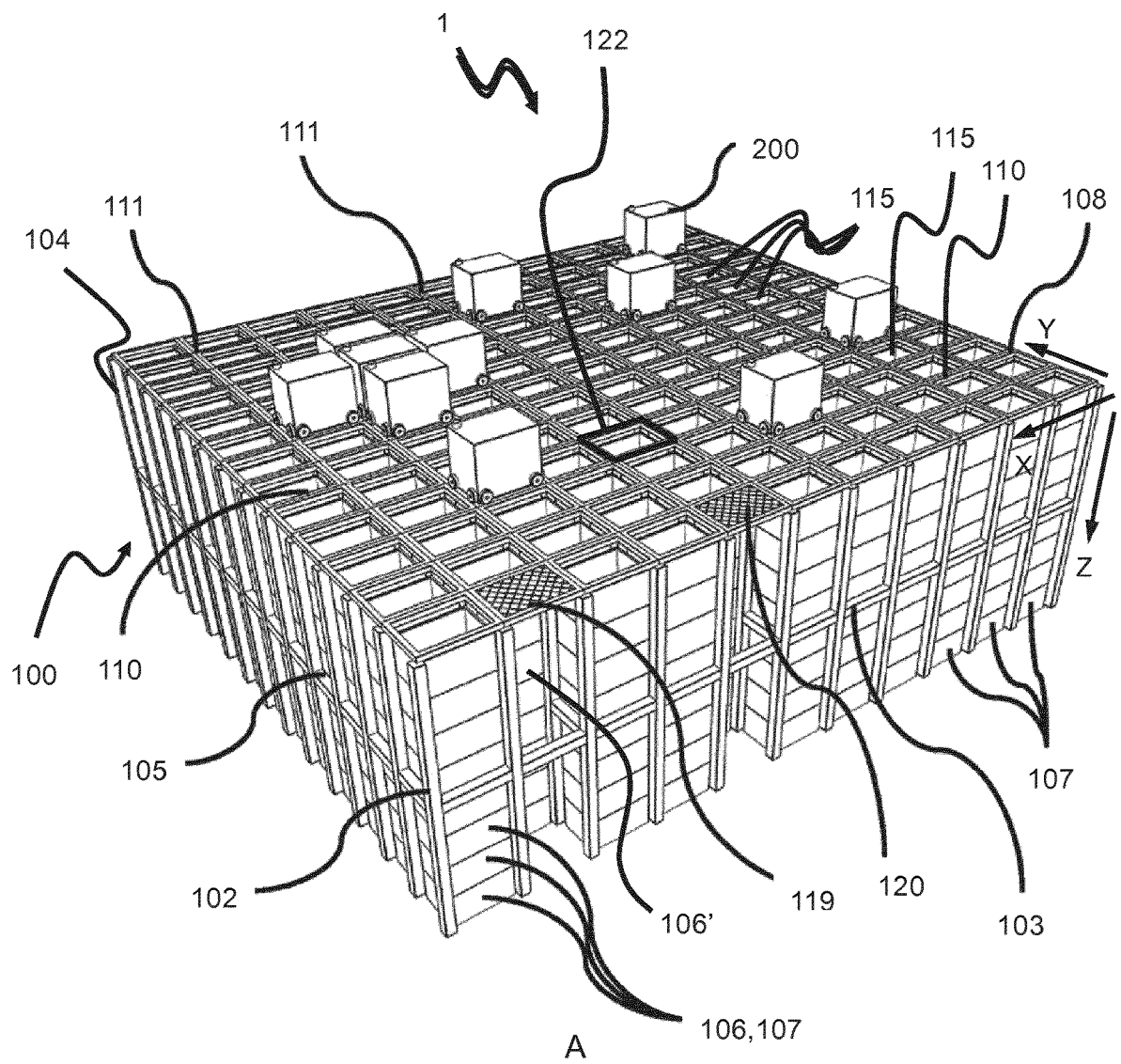
FIG. 1 A-D are perspective views of a prior art automated storage and retrieval system, where FIG. 1A
Figure 1:
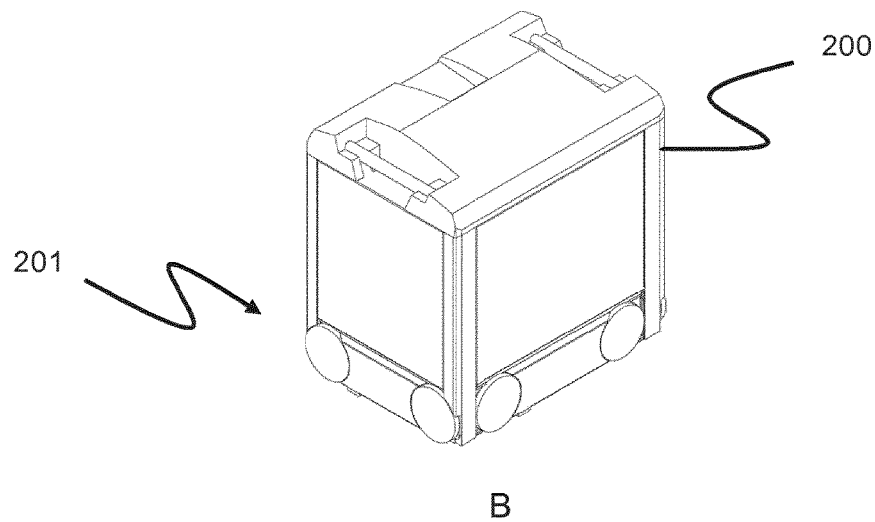
Figure 1:
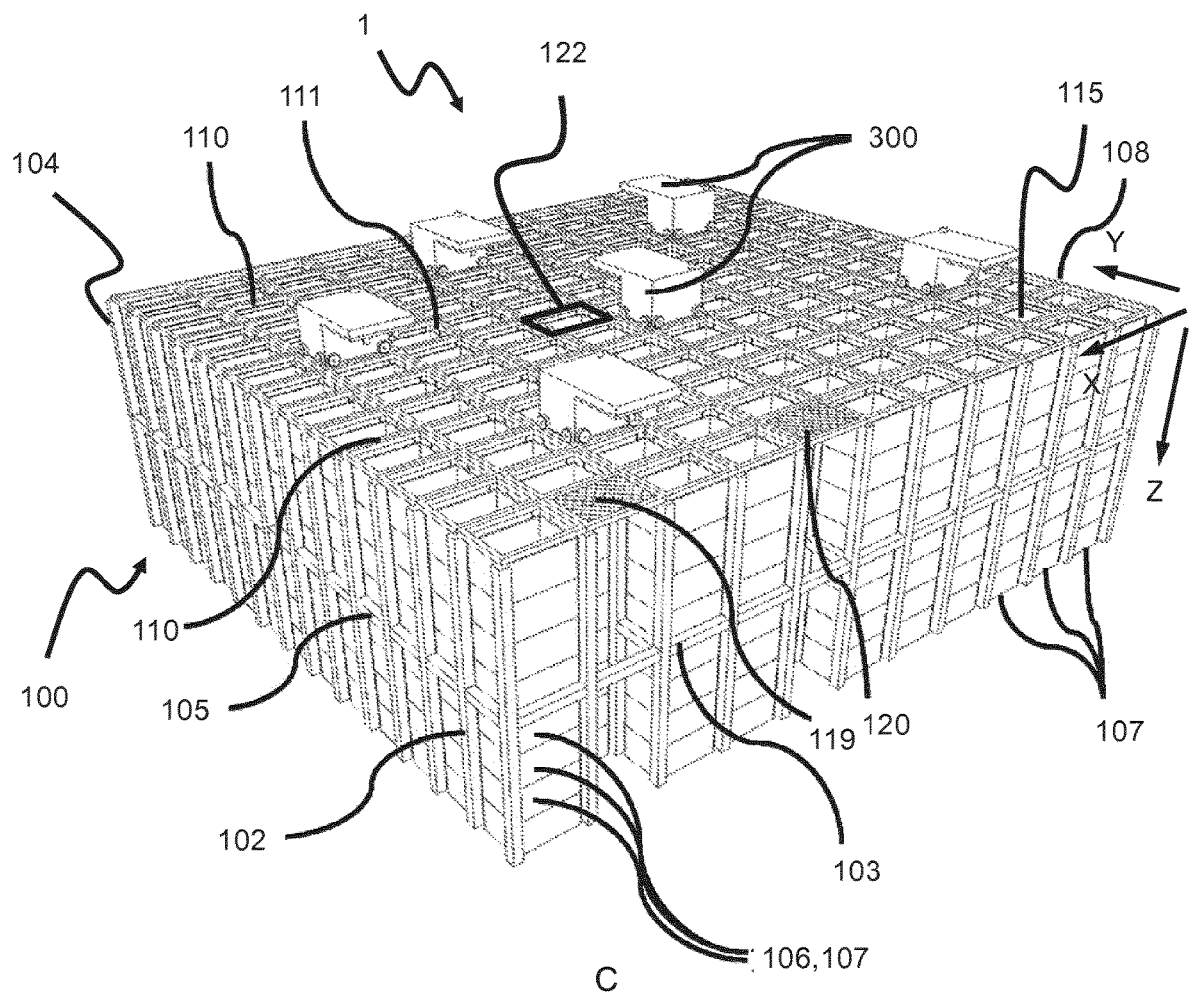
Figure 1:
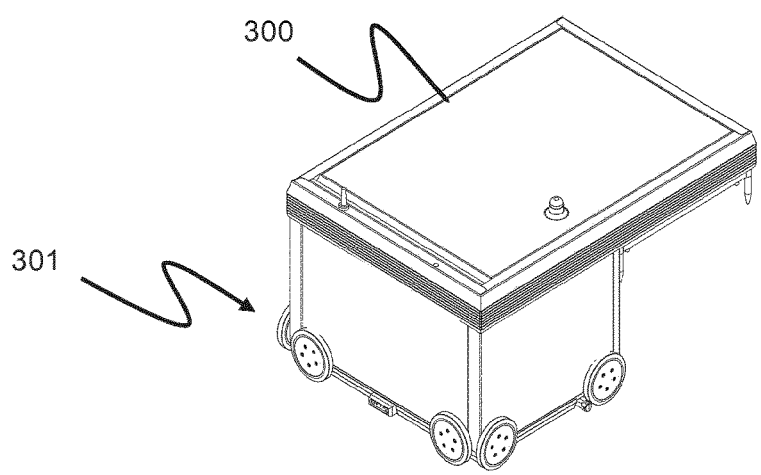

In the following, embodiments of the invention will be discussed in more detail with reference to the appended drawings. It should be understood, however, that the drawings are not intended to limit the invention to the subject-matter depicted in the drawings.

With reference to FIGS. 1A-D, the storage grid 104 of each storage structure 1 constitutes a framework 100 of in total 143 grid columns 112, where the width and length of the framework 100 corresponds to the width and length of 13 and 11 grid columns 112, respectively. The top layer of the framework 100 is a rail system 108 upon which a plurality of container handling vehicles 200,300 are operated.

The framework 100 of the storage structure 1 is constructed in accordance with the above mentioned prior art framework 100 described above, i.e. a plurality of upright members 102 and a plurality of horizontal members 103 which are supported by the upright members 102, and further that the horizontal members 103 includes the container handling vehicle rail system 108 of parallel rails 110,111 in the X direction and the Y direction, respectively, arranged across the top of storage columns 105.

Figure 2:
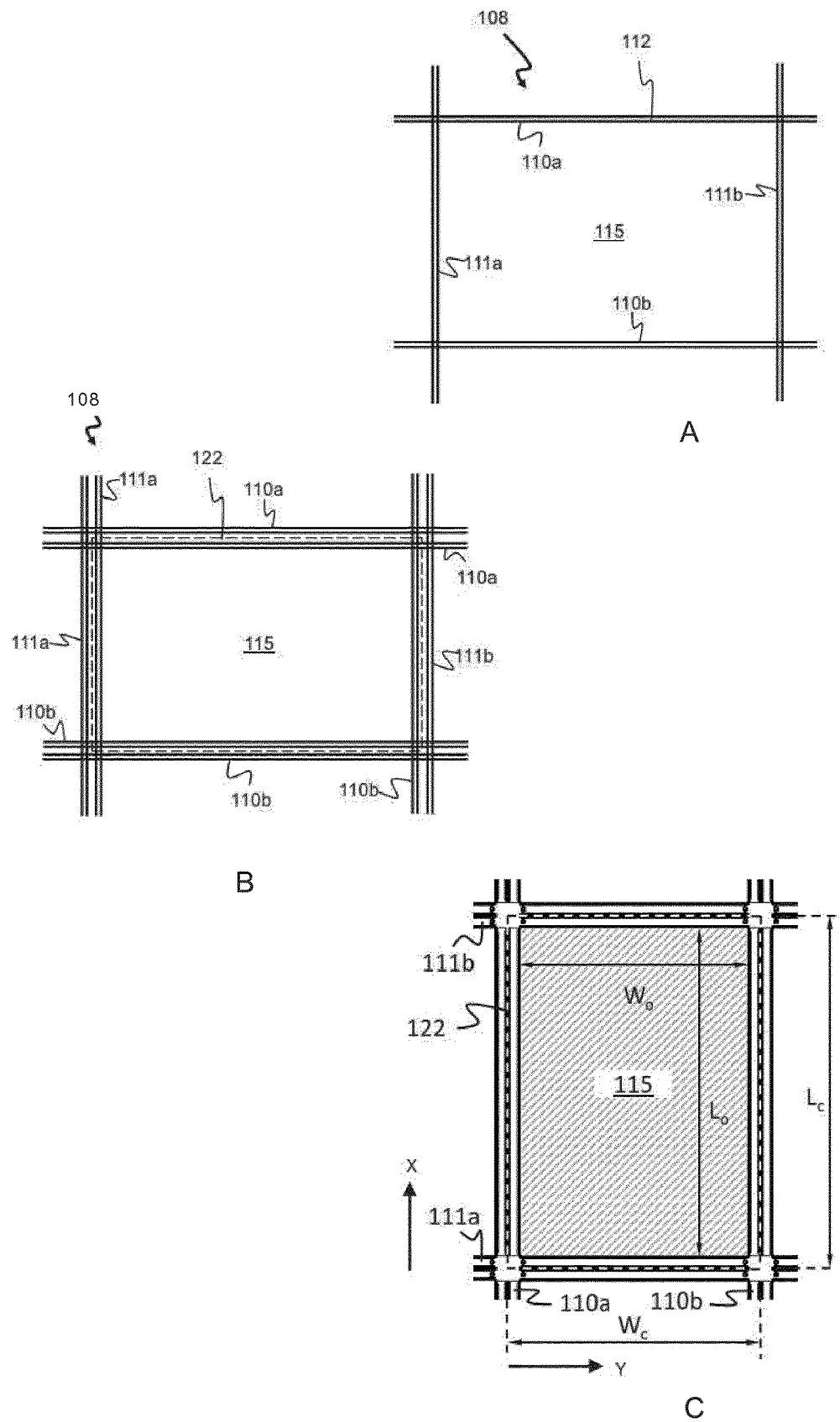
FIG. 2 A-C are top views of a container handling vehicle rail system, where

The horizontal area of a single grid cell 122, i.e. along the X and Y directions, may be defined by the distance between adjacent rails 110 and 111, respectively (including the thickness of the tracks on the rails—see also FIG. 2). In FIGS. 1A and 1C, such a grid cell 122 is marked on the rail system 108 by thick lines.

The container handling vehicle rail system 108 allows the container handling vehicles 200,300 to move horizontally between different grid locations, where each grid location is associated with a grid cell 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the storage grid 104 may have a horizontal extent of more than 700×700 grid cells 122. Also, the storage grid 104 can be considerably deeper than disclosed in FIGS. 1A and 1C. For example, the storage grid 104 may be more than twelve grid cells deep.

The container handling vehicles 200,300 may be of any type known in the art, e.g. any one of the automated container handling vehicles disclosed in WO2014/090684 A1, in NO317366 or in WO2015/193288A1.

The rail system 108 may be a single-track system, as is shown in FIG. 2A. Alternatively, the rail system 108 may be a double track system, as is shown in FIG. 2B. Details of the single and double track system are disclosed this specification under the section of background and prior art.

Figure 3A:
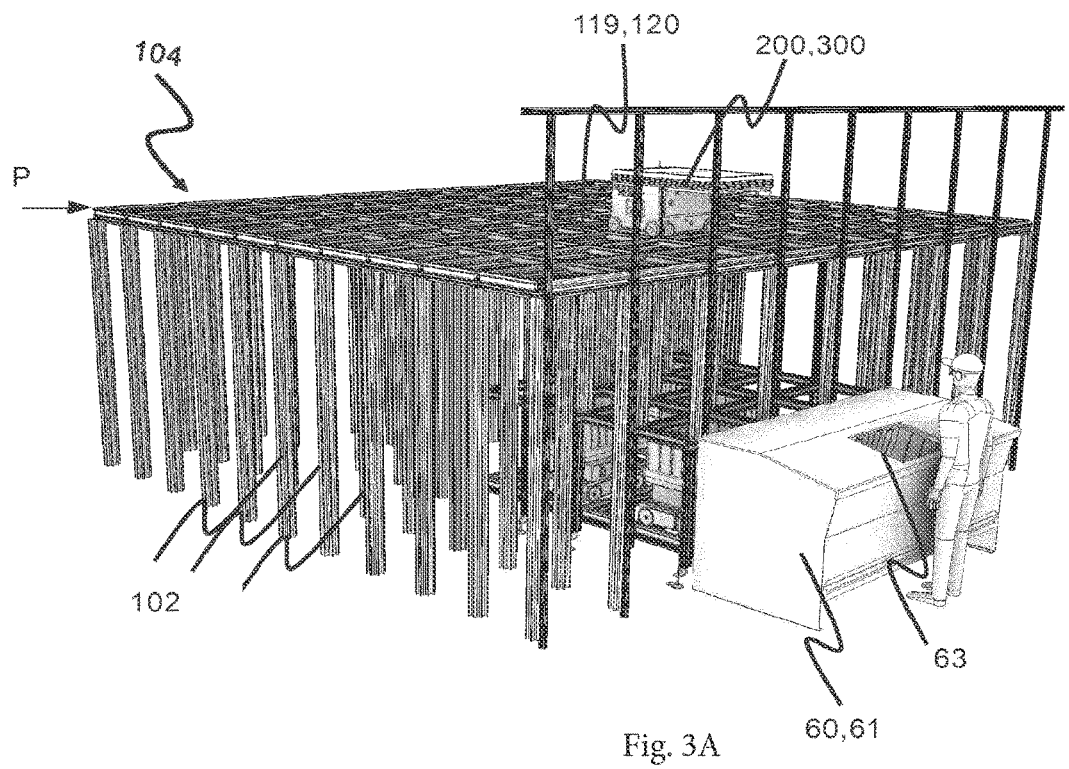
FIG. 3 A-B are perspective views of an automated storage and retrieval system comprising a storage grid, a delivery grid and an accessing station, in FIG. 3A the container accessing station comprises a cabinet, in FIG. 3B the container accessing station comprises walls.
Figure 3B:
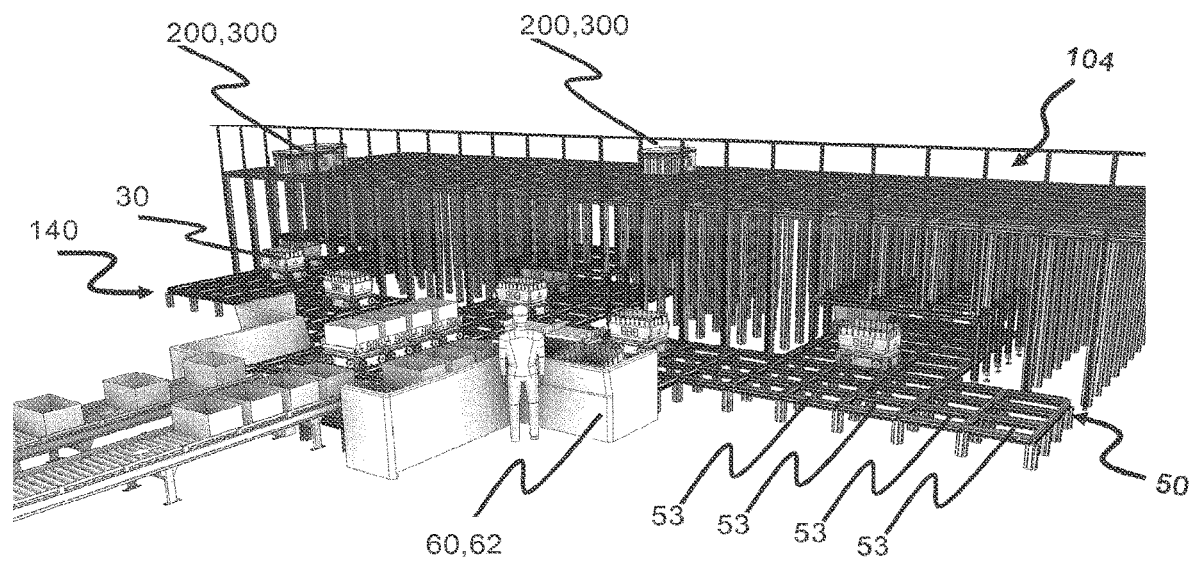

FIG. 3 shows a plurality of remotely operated delivery vehicles 30 on a delivery rail system 50. A remotely operated delivery vehicle 30 may hereinafter be referred to as a delivery vehicle 30.

The delivery vehicle 30 is configured for transport of one or more storage containers 106 between the storage grid 104 configured to store a plurality of stacks 107 of storage containers 106, hereinafter referred to as a storage grid 104, and an access station for handling of the storage container 106 by at least one of a robotic operator and a human operator. The delivery vehicle 30 may be configured for transport of only one storage container 106 or may be configured for transport of more than one storage containers 106 simultaneously.

The delivery vehicle 30 may comprise a vehicle body 31, container carrier 35 for carrying a storage container and a rolling device 32 having eight wheels. A first set of four of the wheels enable lateral or horizontal movement of the delivery vehicle 30 in a first direction and a second set of the other four wheels enable lateral or horizontal movement in a second direction which may be perpendicular to the first direction.

If used on a delivery rail system 50 as shown in FIG. 3, one or both sets of wheels of the rolling device can be lifted and lowered so that the first set of wheels and/or the second set of wheels can be engaged with the respective set of rails provided on the delivery rail system 50 at any one time.

The delivery rail system 50 may be constructed in the same way or a similar way as the rail system 108 for the container handling vehicles 200,300.

Hence, the delivery rail system 50 may comprise a first set of parallel rails 51 arranged in a horizontal plane (P1) and extending in a first direction (X), and a second set of parallel rails 52 arranged in the horizontal plane (P1) and extending in a second direction (Y) which is orthogonal to the first direction (X).

The delivery rail system 50 may also be a double rail system, as is shown in FIG. 2B, thus allowing a delivery vehicle 30 having a footprint generally corresponding to the lateral area defined by a delivery grid column to travel along a row of grid columns even if another delivery vehicle 30 is positioned above a grid column neighboring that row.

Both the single and double rail system, or a combination comprising a single and double rail arrangement in a single rail system, forms a grid pattern in the horizontal plane P1 comprising a plurality of rectangular and uniform grid locations or grid cells, where each grid cell comprises a grid opening 115 delimited by a pair of rails of the first rails and a pair of rails of the second set of rails.

The pair of rails in the X-direction defines parallel rows of delivery grid cells running in the X direction, and the pairs of rails in the Y direction defines parallel rows of delivery grid cells running in the Y direction. The pair of rails in the X and Y direction, together defining a delivery grid cell 53 of a delivery rail system 50.

Accordingly, each delivery grid cell 53 has a width $W_c$ which is typically 30 to 150 cm, and a length $L_c$ which is typically 50 to 200 cm. Each grid opening 115 has a width $W_o$ and a length $L_o$ which is typically 2 to 10 cm less than the width $W_c$ and the length $L_c$ of the delivery grid cell 53.

The delivery rail system 50 in FIG. 3, extends from a location inside the storage grid 104 to a location outside the storage grid 104. One or more second locations, i.e. a structure for picking and placing items in the storage containers 106, may be arranged somewhere at the periphery of the part of the delivery rail system 50 located outside the storage grid 104.

A container accessing station 60 is arranged for separating the delivery rail system 50 and the delivery vehicles 30 from the human or robotic operator. The container accessing station 60 comprises the access point which is a location connected to the delivery rail system 50 where product items are removed from or placed into the storage containers 106. At the access point (which might be, for example, a picking or stocking station), the storage containers 106 are normally never removed from the storage structure 1 but are returned into the storage grid 104 when no longer required by the human or robot operator. The human operator may be for example a picker provided for handling the goods/items within the container. The pickers will be picking items from, or re-stocking items in the container, or they will be handling the entire storage container 106 by replacing, removing and/or inserting containers into the storage system 1.

In FIG. 3 A, the container accessing station 60 comprises a cabinet 61 for separating the human operator from the delivery rail system 50 and the delivery vehicles 30. The cabinet 61 comprises walls and a top cover supported thereon, wherein the items held in the storage container 106 carried by a remotely operated delivery vehicle 30 at the access point is reachable through an opening 63 in the top cover. Thus, through the opening 63 the human operator may access items held in the storage containers 106 delivered to the access point by the delivery vehicle 30.

In FIG. 3 B, the container accessing station 60 comprises walls 62 separating the human operator from the delivery rail system 50 and the delivery vehicles 30. The access point may be any location at the container accessing station 60 at which a human operator may access items held in the storage containers delivered to the access point by the delivery vehicle 30. Thus, the access point is an area corresponding to one or more platform grid cell 25 that is/are arranged on a delivery grid 51 side of the wall in a position where the items held in the storage container 106 carried by a remotely operated delivery vehicle 30 can be reached by the robotic or human operator reaching over the wall 62.

Figure 4:
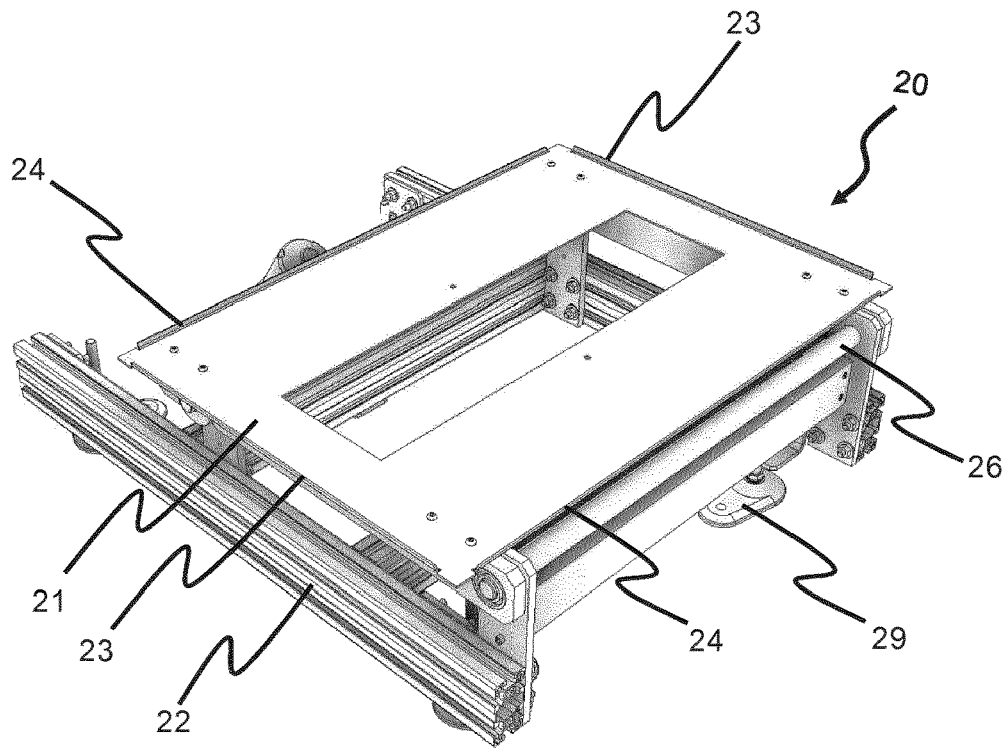
FIG. 4 is a perspective view of the vehicle tilting platform.

FIG. 4 is a perspective view of a vehicle tilting device 20 comprising a base structure 22 arranged to support a tiltable platform 21. The base structure 22 may comprise, for example, four adjustable feet 29 that may be used to level the base of the vehicle tilting device 20 on an uneven floor or to adjust the tiltable platform 21 to be level with a delivery rail system 50 (when in a non-tilted configuration).

The tiltable platform 21 comprises guiding features 23,24 adapted to guide the delivery vehicle 30 onto the tiltable platform 21. The guiding features 23,24 may comprise raised edges 23,24 provided along a periphery of the tiltable platform 21, such that the wheels of the delivery vehicle 30 may be guided onto the tiltable platform 21.

The raised edges 23,24 may comprise a first set of parallel edges 24 extending in a first direction (X), and a second set of parallel edges 23 extending in a second direction (Y) which is orthogonal to the first direction (X), which first and second sets of raised edges 23,24 together defining a platform grid cell 25 corresponding to a delivery grid cell 53 of the delivery rail system 50 such that the delivery vehicle 30 can move from the delivery grid cell 53 and onto the tiltable platform 21.

The tiltable platform 21 is arranged to be connected to a delivery grid cell 53 of a delivery rail system 50 such that that there is a path to and/or from the tiltable platform 21 for the delivery vehicle 30 via the delivery grid cell 53.

Figure 6:
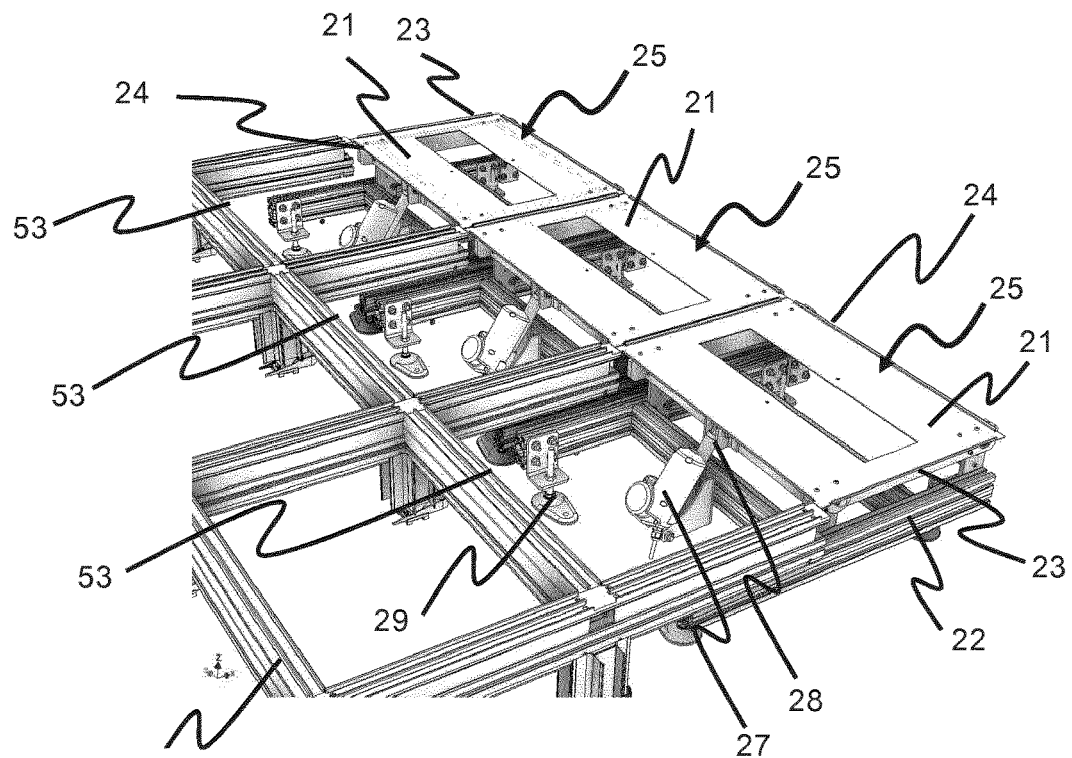
FIG. 6 is a perspective view of three vehicle tilting devices adjacent to each other and each connected to a delivery grid cell.
Figure 7:
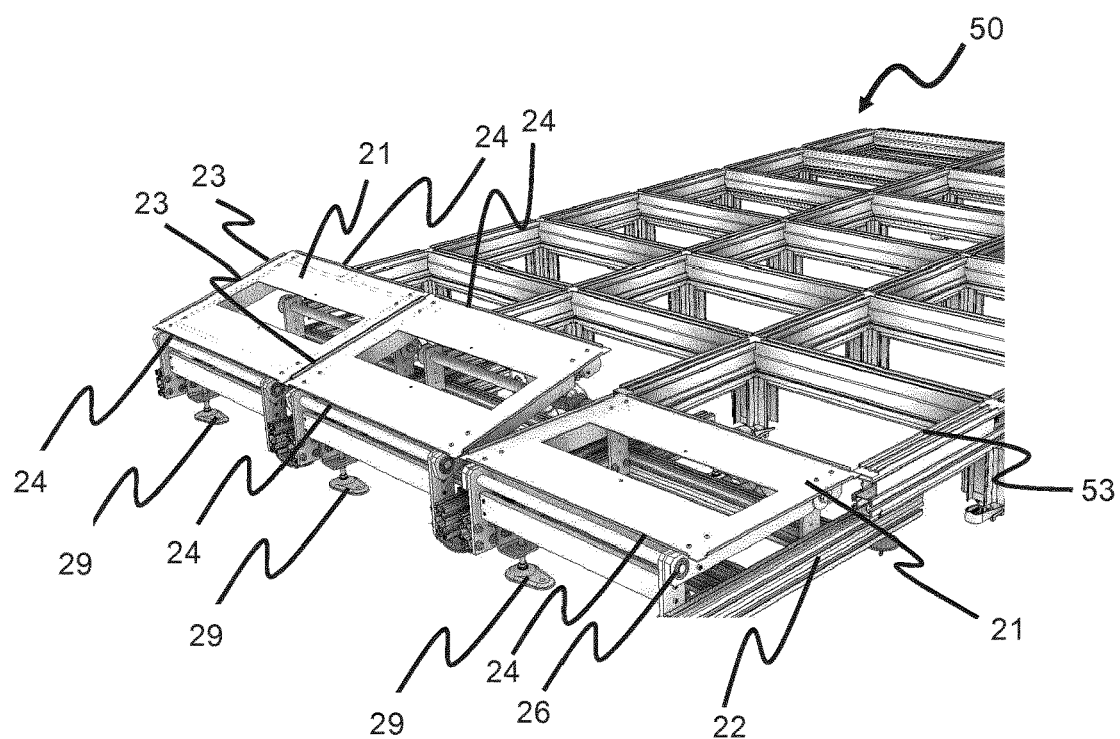
FIG. 7 is a perspective view of the three vehicle tilting devices in a tilted and not tilted position.
Figure 8:
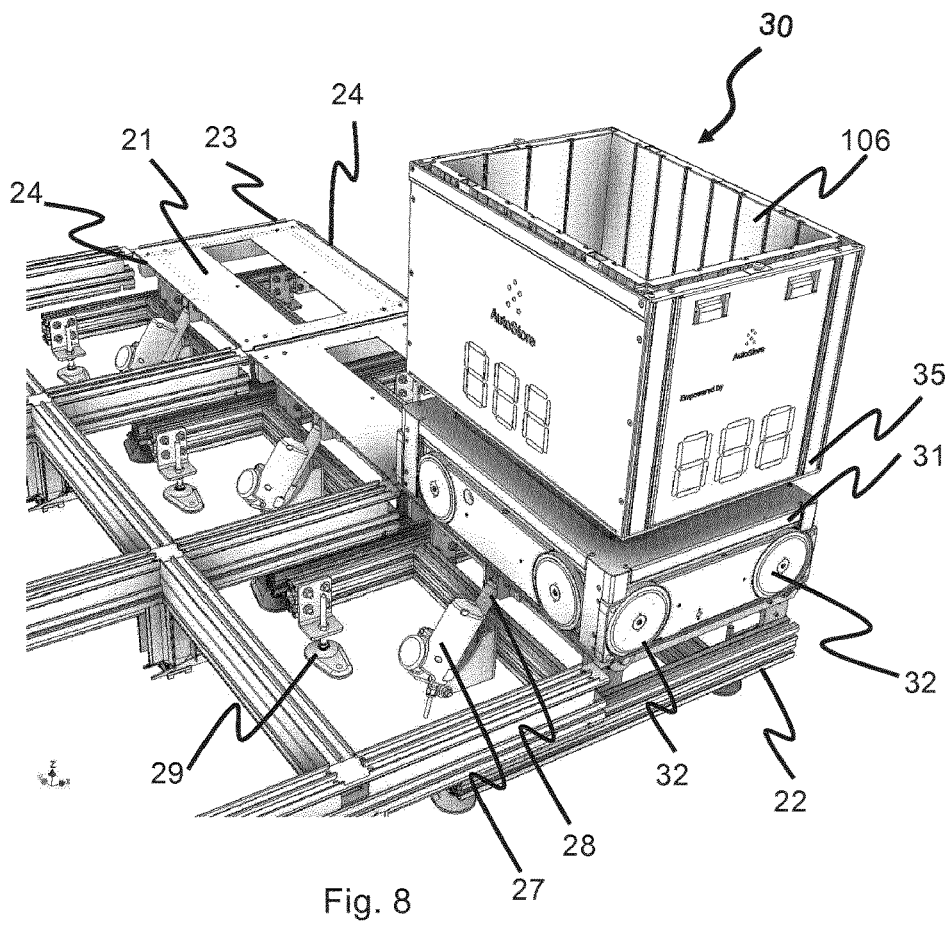
FIG. 8 is a perspective view of a delivery vehicle carrying a storage container, wherein the delivery vehicle is positioned on a vehicle tiling device.
Figure 9:
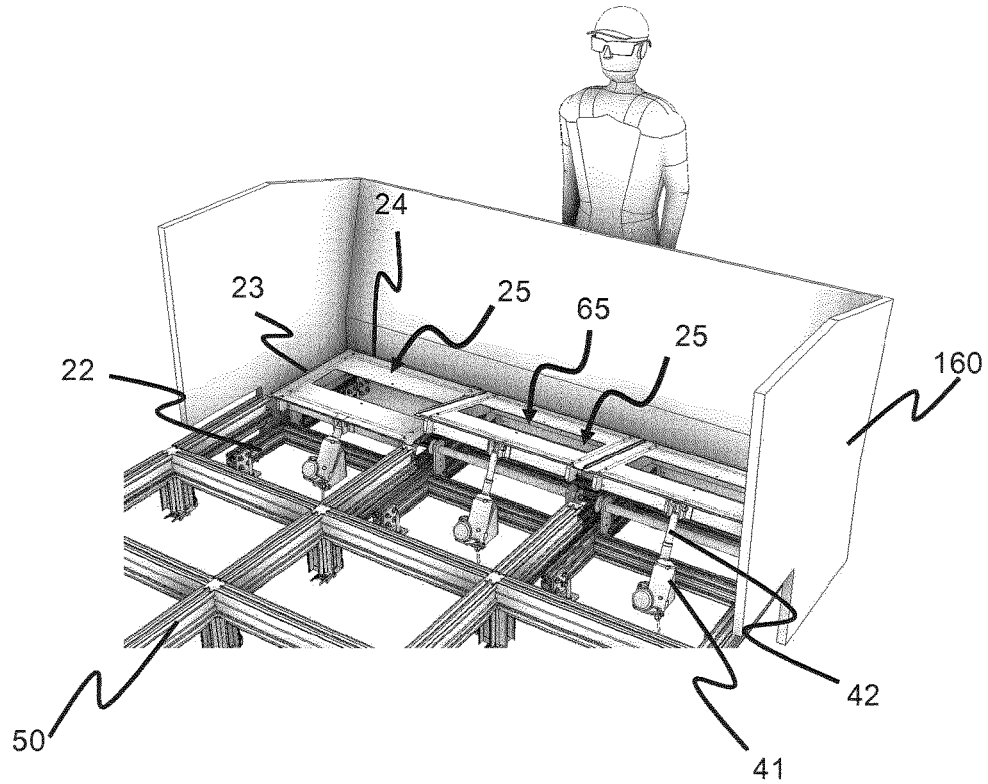
FIG. 9 is a perspective view of a container accessing station comprising walls separating the human operator from the vehicle tilting device.
Figure 10:
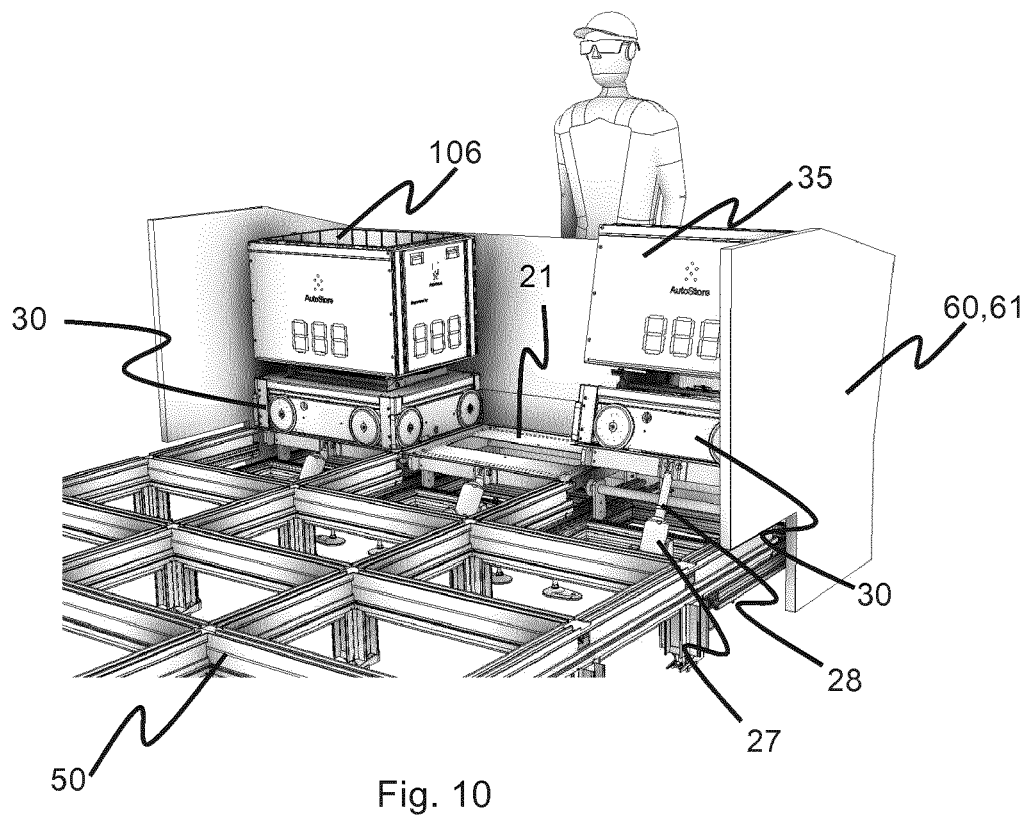
FIG. 10 is a perspective view of a container accessing station comprising walls and containing two delivery vehicles.
Figure 11:
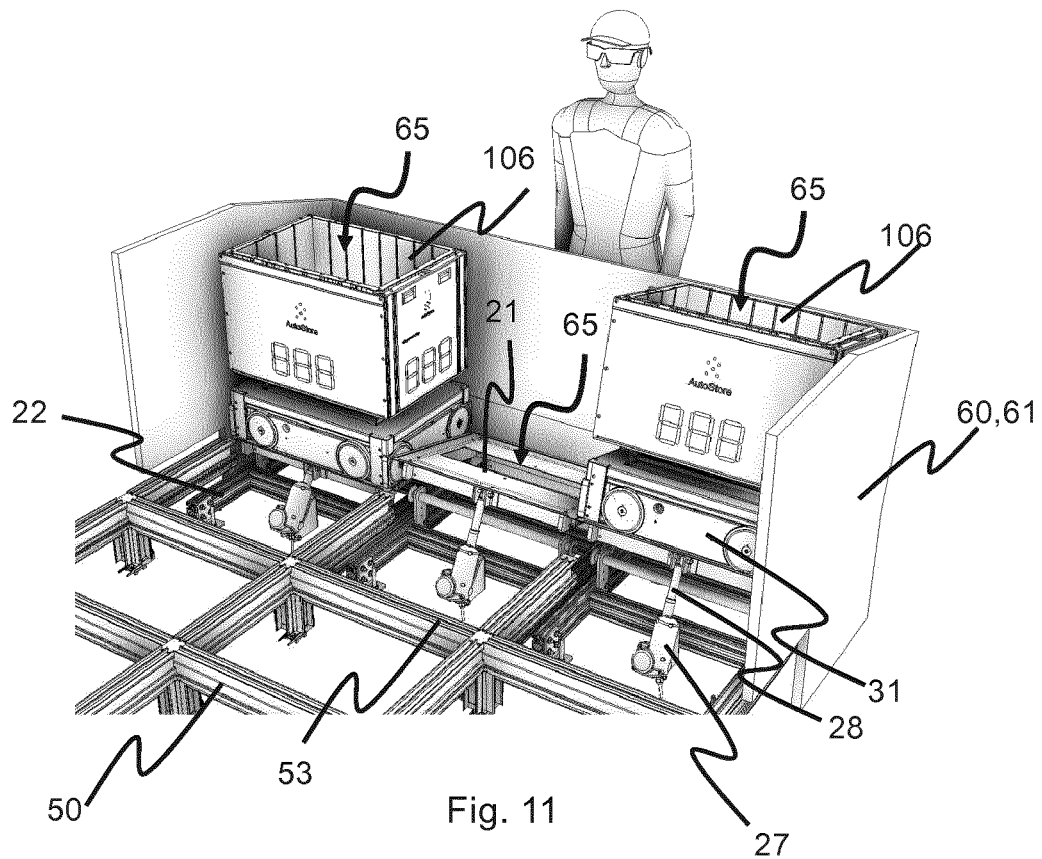
FIG. 11 is a perspective view of the container accessing station in FIG. 10, where the middle vehicle tilting device is tilted.

The platform grid cell 25 may be arranged so that it is connected to a delivery grid cell 53 (as shown in FIGS. 6-11) of a delivery rail system 50 such that a remotely operated delivery vehicle 30 (as shown in FIGS. 8, 10 and 11), may enter the tiltable platform 21 from the grid cell 53 of the delivery rail system 50 and exit the tiltable platform 21 to the grid cell 53 of the delivery rail system 50.

The vehicle tilting device 20 may comprise a unit (or set of units) that is fitted at an end of the delivery rail system to make up an additional grid cell or an additional row of grid cells that is/are able to tilt up a delivery vehicle carrying a container. The vehicle tilting device 20 may connect with the delivery rail system 50 in the sense of providing a continuation of the delivery rail system that the delivery vehicles can drive onto. The vehicle tilting device 20 may not be directly connected to the rest of the delivery rail system; alternatively, it may be connected mechanically with the delivery rail system 50, for example, through being connected with fasteners or through other mechanical engagement. In FIG. 6, for example, the base structure 22 is shown in position under the rails of the delivery rail system 50. Alternatively, it could be held in engagement with the delivery rail system 50 through being raised up by the adjustable feet 29 to bring a top surface of the base structure 22 into contact with an undersurface of the rails of the delivery rail system 50.

The extent of the platform grid cell 25 corresponds to the extent of a delivery grid cell such that the tiltable platform 21 may receive one remotely operated delivery vehicle 30. That is, when a delivery vehicle 30 is positioned on the tiltable platform 21, the wheels of the delivery vehicle 30 are all positioned on the tiltable platform 21.

Figure 5:
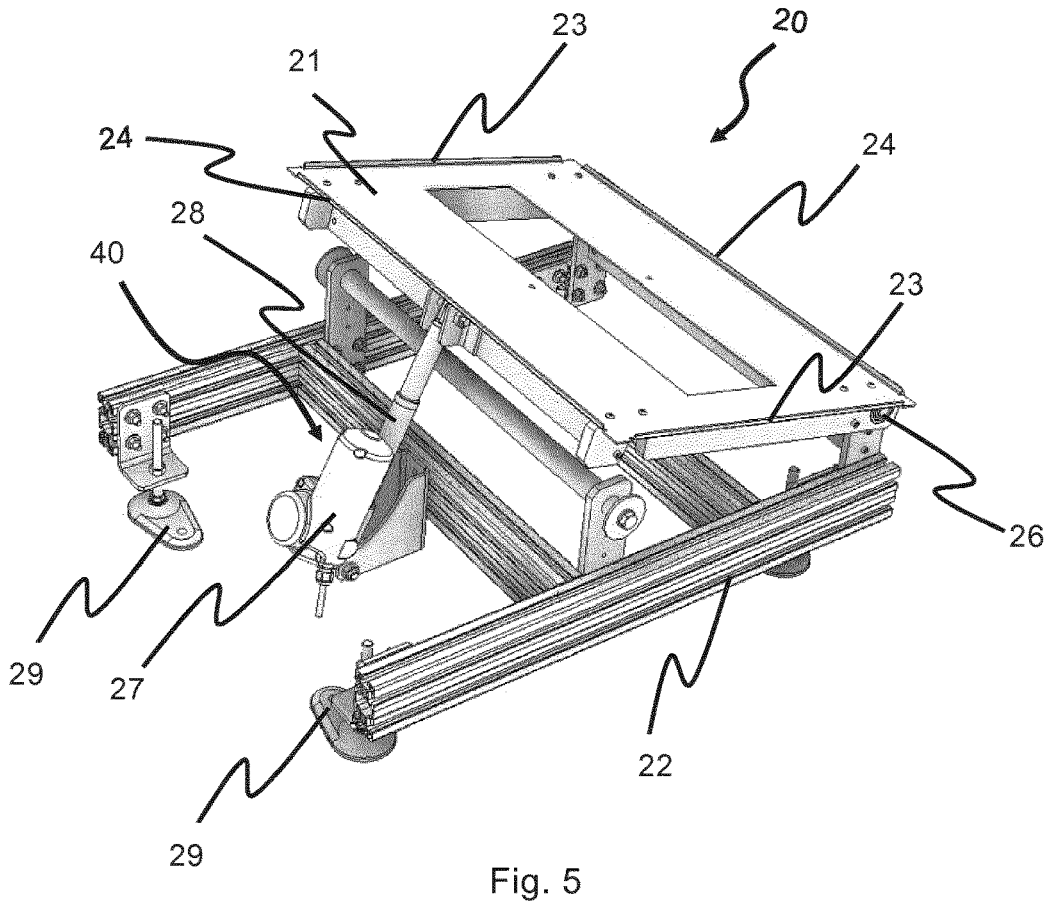
FIG. 5 is another perspective view of the vehicle tilting platform showing a tilting device.

As shown in FIGS. 4 and 5, the tiltable platform 21 is pivotably connected to the base structure 22 at a first platform side. The pivot connection comprises a shaft 26 mounted to the base structure 22 and the tiltable platform 21 is connected to the shaft 26 such that it may pivot together with the shaft 26 or it may pivot relative to the shaft 26.

The vehicle tilting device 20 further comprises a tilting actuator 40 connected to a second side of the tiltable platform 21 and arranged such that it can lift the second side to a tilted position. Thus, the tiltable platform 21 may be lifted at the second side such that it is tilted towards the first side. The tilting actuator 40 may comprise a motor 27 for driving a telescoping rod 28 (lifting mechanism).

In this manner the storage container(s) 106 that are arranged on a remotely operated delivery vehicle 30 can be brought from a horizontal position to a tilted position whilst the delivery vehicle 30 is on the tiltable platform 21. The ability to tilt a remotely operated vehicle 30 and thus the storage container 106, allows a human operator to view and/or access items within the storage container 106 more easily.

In FIGS. 6 and 7, three vehicle tilting devices 20 may be arranged at an access point where items held in a storage container may be accessed by a human or robotic operator. The delivery vehicle 30 may arrive at the access point, whereupon the delivery vehicle 30 is tilted to allow easy access to the items stored in the storage container 106.

The tilting angle range of the tiltable platform, may be from 2° to 60° relative to the horizontal plane, more preferably from 3° to 50°, even more preferably from 4° to 45°, even more preferably from 5° to 40°, even more preferably from 6° to 35°, even more preferably from 7° to 30°, even more preferably from 8° to 25°, even more preferably from 9° to 20°, for example 15°.

The tiling angle may be adjustable to a degree to suit the human operator, depending on the height of the operator, for example, to accommodate where that person is shorter or taller than average.

FIGS. 6 and 7 shows three vehicle tilting devices 20, provided at an access point of the delivery system. The three vehicle tilting devices 20 is arranged in connection with a delivery rail system 50 comprising a plurality of delivery grid cells. The three vehicle tilting devices 20 defines three access points at which a robot or human operator may access a storage container that has been delivered to the access point on a remotely operated delivery vehicle 30. Each tiltable platform 21 may be individually operated such that they may tilt relative to one another. The FIG. 9 shows that each vehicle tiling device 20 may be tilted individually. The three access points may be provided in a container accessing station 60 as shown in FIG. 9-11.

FIG. 8 shows a remotely operated delivery vehicle 30 transporting a storage container 106 that has moved onto a vehicle tilting device 20 defining an access point of the delivery system.

An advantage of the present invention is that an access point may be created at any desired position on the delivery rail system 50. At a desired location, the delivery rail system 50 may be connected to one or more vehicle tilting devices 20. In this way, an access point comprising a vehicle tilting device 20 may be established quickly and simply, providing increased access to the contents of a storage container 106.

FIG. 8 shows a delivery vehicle 30 carrying a storage container 106. The vehicle 30 is guided by the guiding features 23,24 onto a vehicle tiling platform 20 from a delivery grid cell 53. The delivery vehicle 30 may exit the vehicle platform to the same delivery grid cell 53, or it may move to the adjacent vehicle tilting device 20.

In this way the delivery vehicle 30 may have one or more path for a delivery vehicle 30 to and from the vehicle tiling platform 20.

FIGS. 10 and 11 shows a container accessing station 60 arranged as walls 62 separating the human operator from the delivery rail system 50 and the delivery vehicles 30. The container accessing station 60 comprises three vehicle tilting devices 20.

The vehicle tilting devices 20 are located adjacent to each other at the container accessing station 60 such that the delivery vehicle may move from one tiltable platform 21 to another. The vehicle tilting devices 20 may tilt synchronously or may be connected together if it is desired to tilt more than one of the vehicle positions at a time.

The container accessing station 60 may comprise one or more walls 62 or a cabinet 61 for separating the human operator from the vehicle tilting device 20.

Tilting of storage containers 106 is advantageous when a human operator is using the container accessing station 60. However, the tilting operation inevitably causes lag in the flow of storage containers 106 flowing through a container accessing station 60. There may be different reasons why there is no need for tilting the delivery vehicle 30 and the storage container 106. Thus, the tilting of the vehicle tilting device 20 is optional and may be manually operated by a human operator.

Figure 12:
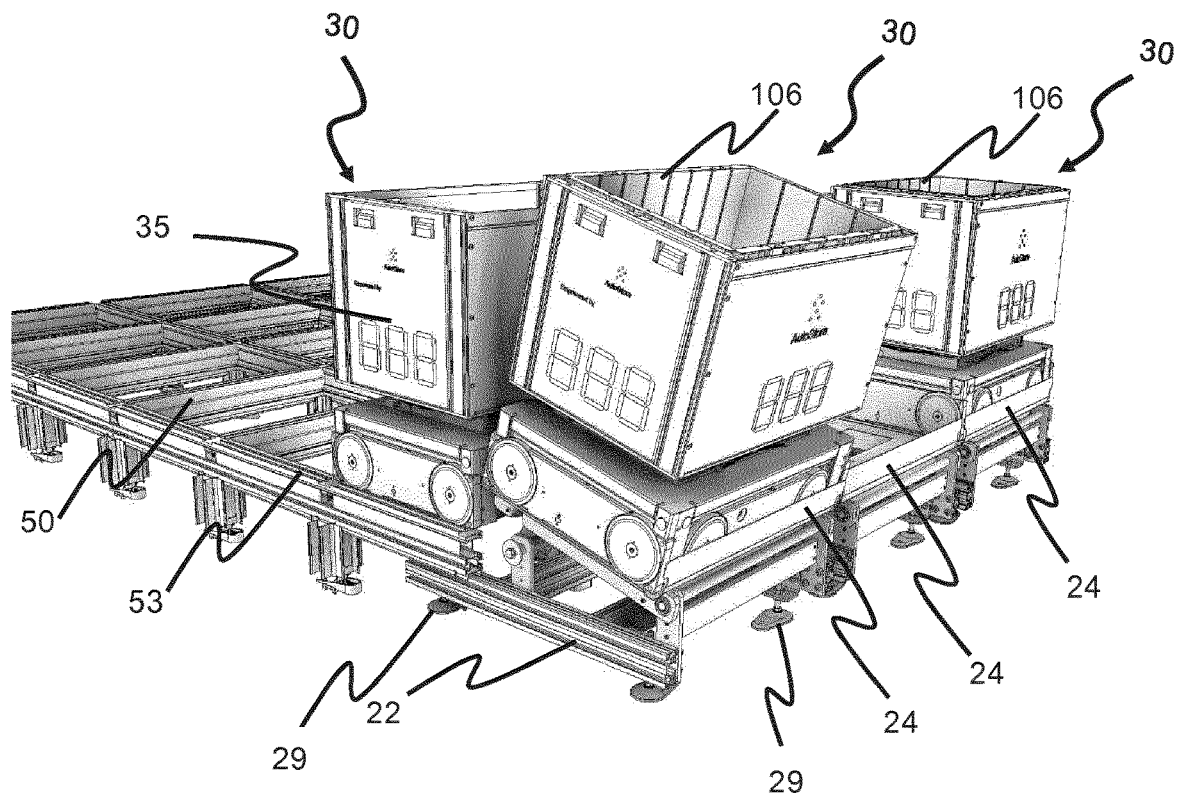
FIG. 12 is a perspective view of the container accessing station and the vehicle tilting platform comprising increased height of the raised edges, preventing the vehicle from falling off the tiltable platform.
Figure 13:
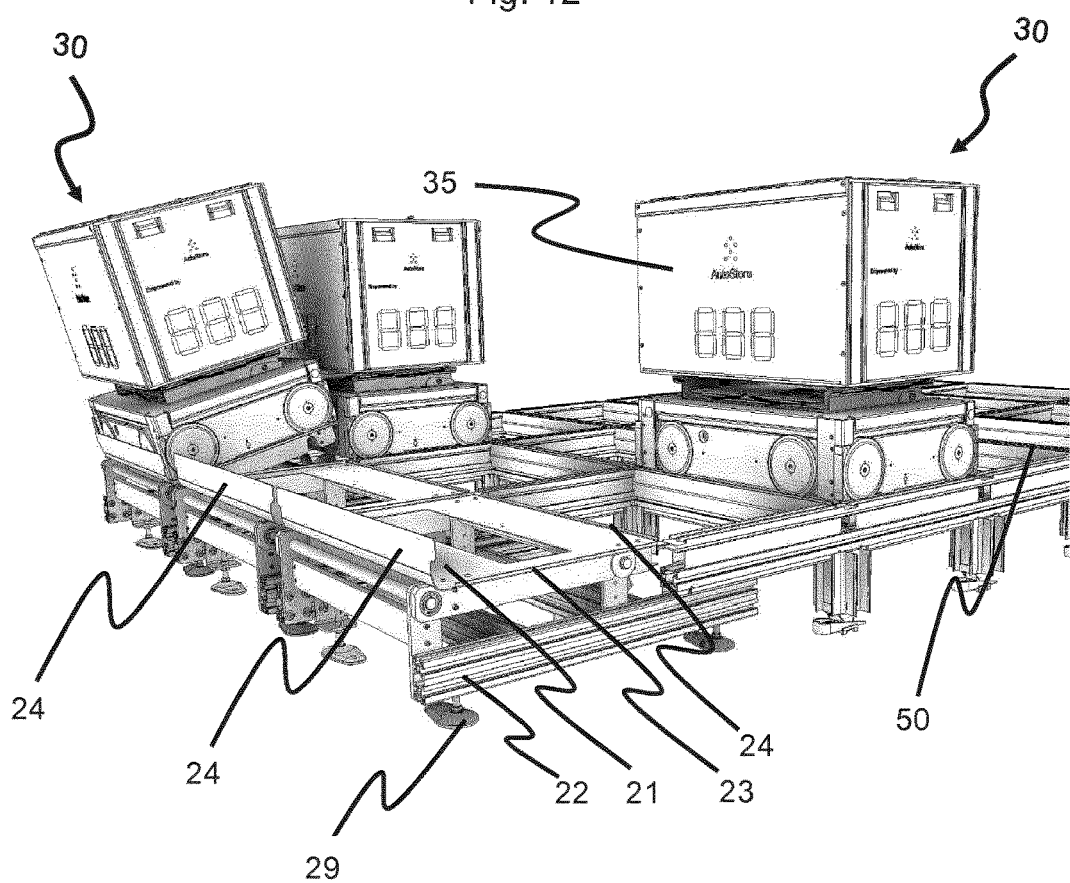
FIG. 13 is a perspective view of the container accessing station in FIG. 12, from another angle.

In FIGS. 12 and 13, the vehicle tilting device 20 may comprise an edge comprising increased height such that the edge may support the vehicle on the platform 21 and thus, preventing the vehicle from falling off the tiltable platform 21. The raised edge with increased height may be arranged at the second platform side, such that the vehicle is tilted towards said raised edge.

REFERENCE NUMERALS

20 Vehicle tilting device
21 Tiltable platform
22 Base structure
23 Raised edge Y direction
24 Raised edge X direction
25 Platform grid cell
26 Shaft
27 Motor
28 Lifting mechanism
29 Adjustable feet
30 Delivery vehicle
31 Vehicle body
32 Rolling device
35 Container carrier
40 Tilting actuator
50 Delivery rail system
51 Delivery grid
52 Delivery grid cell
60 Container accessing station
61 Cabinet
62 Wall
63 Opening top cover of cabinet
65 Access point
P1 Horizontal plane of delivery rail system
100 Framework structure
102 Upright members of framework structure
103 Horizontal members of framework structure
104 Storage grid/three-dimensional grid
105 Storage column
106 Storage container
107 Stack
108 Rail system
110 First set of parallel rails in first direction (X)
111 Second set of parallel rails in second direction (Y)
115 Grid opening
119 Delivery column
120 Delivery column
122 Grid cell
140 Delivery system
150 Delivery port
200 First container handling vehicle
201 Wheel arrangement
300 Second container handling vehicle
301 Wheel arrangement
X First direction
Y Second direction
P Horizontal plane of rail system

The invention claimed is:

1. A vehicle tilting device for tilting a delivery vehicle for increasing access to items from a storage container transported on the delivery vehicle, the vehicle tilting device comprising:
   a base structure; and
   a tiltable platform connected to the base structure, wherein the tiltable platform comprises guiding features adapted to guide the delivery vehicle onto the tiltable platform,
   wherein the guiding features comprises raised edges provided along a periphery of the tiltable platform, wherein the raised edges comprise a first set of parallel edges extending in a first direction, and a second set of parallel edges extending in a second direction which is orthogonal to the first direction, which first and second sets of edges together defining a platform grid cell.

2. The vehicle tilting device according to claim 1, wherein one of the edges of the first and/or second sets of parallel edges providing a stop edge of the tiltable platform to prevent the delivery vehicle from running off the platform or falling off the tiltable platform when the platform is tilted.

3. The vehicle tilting device according to claim 1, wherein the tiltable platform is pivotably connected to the base structure at a first platform side.

4. The vehicle tilting device according to claim 3, wherein the tiltable platform comprises a tilting actuator arranged for lifting the tiltable platform at a second platform side which is opposite the first platform side, such that the tiltable platform is tilted towards the first platform side.

5. The vehicle tilting device according to claim 4, wherein the tilting actuator comprises a motor for driving a lifting mechanism.

6. The vehicle tilting device according to claim 1, wherein the base structure comprises adjustable feet for height adjustment of the tiltable platform.

7. A container accessing station, comprising:
   a vehicle tilting device, wherein the vehicle tilting device comprises:
      a base structure; and
      a tiltable platform connected to the base structure, wherein the tiltable platform comprises a first set of parallel edges extending in a first direction, and a second set of parallel edges extending in a second direction which is orthogonal to the first direction, which first and second sets of raised edges together defining a platform grid cell,
      wherein the platform grid cell is adapted to be connected to a delivery grid cell of a delivery rail system such that that there is a path to and/or from the tiltable platform for the delivery vehicle via the delivery grid cell.

8. The container accessing station according to claim 7, wherein the container accessing station comprises a first and a second vehicle tilting device, and wherein the first and the second tilting device are connected to each other such that a delivery vehicle can move between the platform grid cell of the first and the second vehicle tilting device, and wherein each of the first and the second tilting device is connected to a respective grid cell of a delivery rail system such that there is more than one path to and from each tilting device for the delivery vehicle.

9. The container accessing station according to claim 7, wherein the container accessing station comprises at least any one of a cabinet or a wall arranged for separating a human operator from the vehicle tilting device.

10. A delivery system, comprising:
    a delivery rail comprising a first set of parallel rails arranged in a horizontal plane and extending in a first direction, and a second set of parallel rails arranged in the horizontal plane and extending in a second direction which is orthogonal to the first direction;
    a container accessing station according to claim 7 comprising an access point; and
    a vehicle tilting device located at the access point, and
    wherein the vehicle tilting device is connected to the delivery rail such that that a delivery vehicle can move from the delivery rail and onto the vehicle tilting device.

11. A method of accessing a storage container carried on a delivery vehicle in a container accessing station according to claim 7, the method comprising:
    guiding the delivery vehicle onto a tiltable platform of a vehicle tilting device; and
    tilting the delivery vehicle together with the storage container being carried towards a human or robotic operator in order to allow increased access to items inside the storage container.

* * * * *